SYSTEM AND METHOD OF COMMUNICATION

Filed July 17, 1948 4 Sheets-Sheet 1

Inventors
Robert H. Rines
Isaac S. Blonder
by Rines and Rines
Attorneys

Inventors
Robert H. Rines
Isaac S. Blonder
by Rines and Rines
Attorneys

Inventors
Robert H. Rines
Isaac S. Blonder
by Rines and Rines
Attorneys

Inventors
Robert H. Rines
Isaac S. Blonder
by Rines and Rines
Attorneys

Patented Jan. 30, 1951 2,539,594

UNITED STATES PATENT OFFICE 2,539,594

SYSTEM AND METHOD OF COMMUNICATION

Robert H. Rines, Cambridge, Mass., and Isaac S. Blonder, Flushing, N. Y.

Application July 17, 1948, Serial No. 39,286

51 Claims. (Cl. 250—17)

The present invention relates to systems and methods of communication and more particularly to the generation, transmission and reception of radio waves.

An object of the invention is to provide a new and improved system for the modulation of radio waves.

A further object is to provide a novel system for modulating radio waves external to the oscillating circuits.

Another object is to provide a new and improved system for modulating reflected or directed radio waves.

Other and further objects will be explained hereinafter and will be particularly pointed out in the appended claims.

Figure 1:
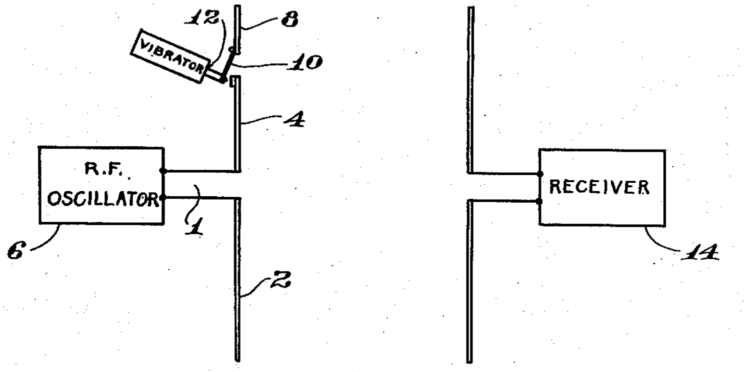
Figure 2:
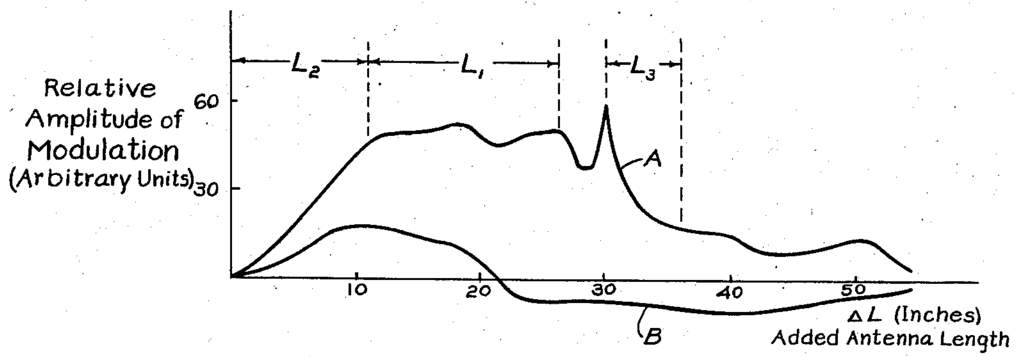
Figure 3:
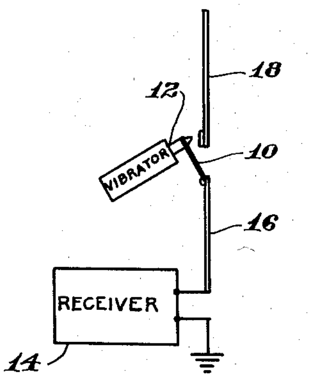
Figure 4:
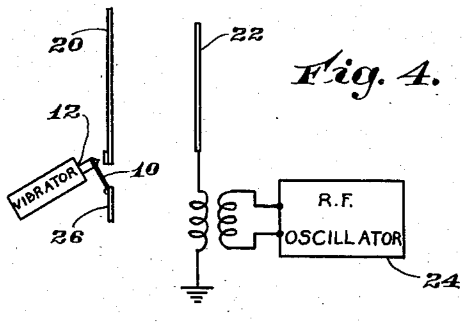
Figure 5:
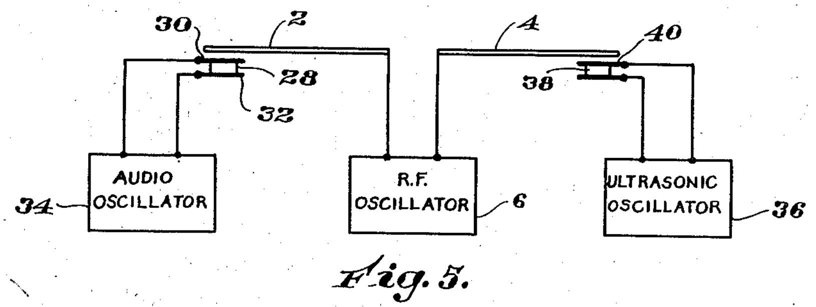
Figure 6:
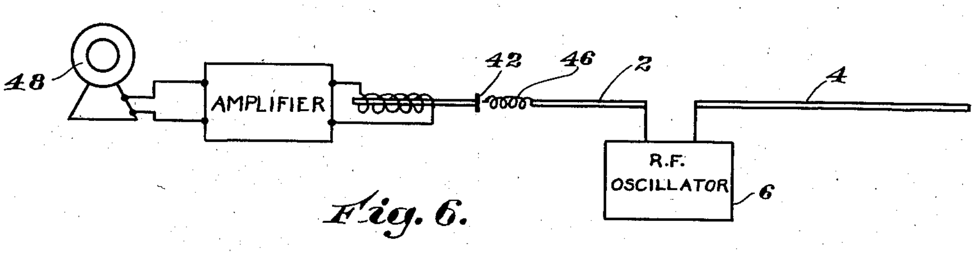
Figure 7:
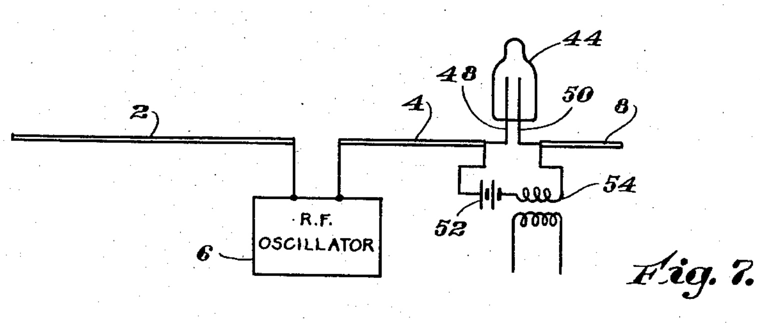
Figure 8:
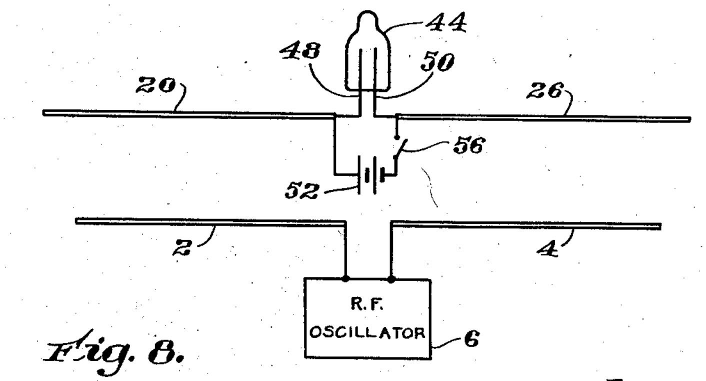
Figure 16:
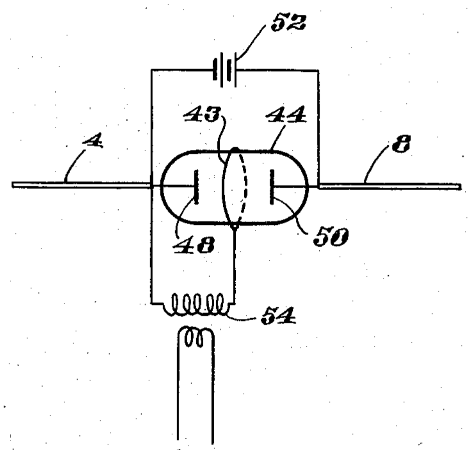
Figure 17:
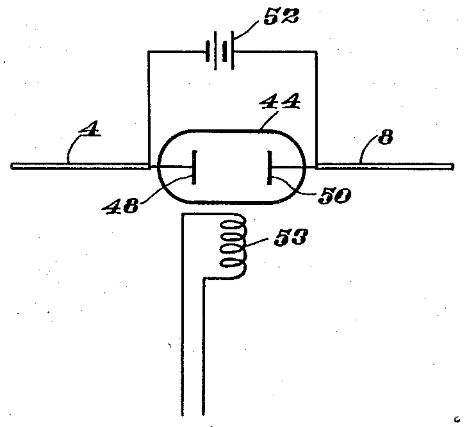
Figure 10:
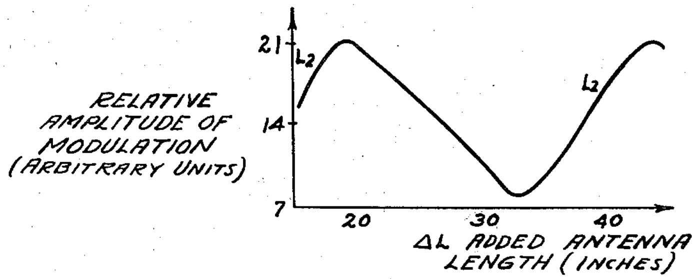
Figure 9:
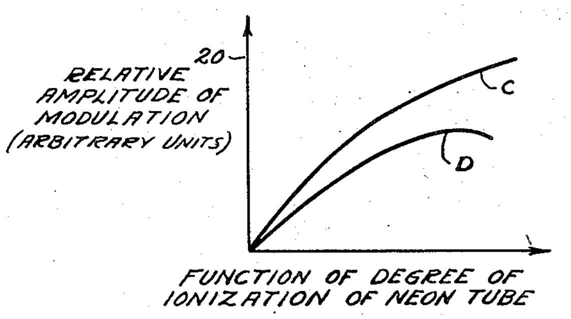
Figure 11:
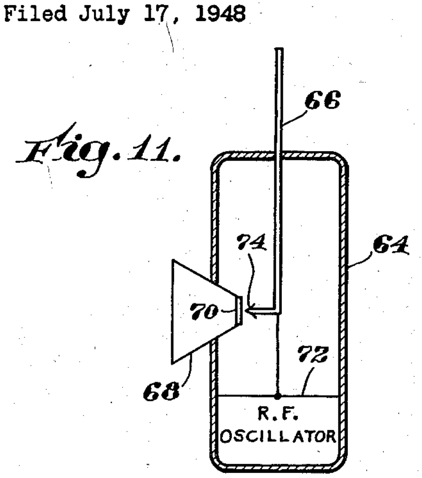
Figure 12:
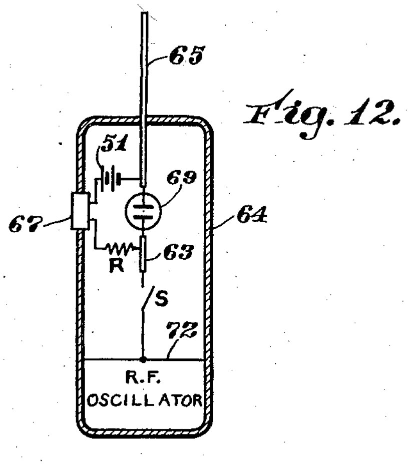
Figures 13, 14, 15:
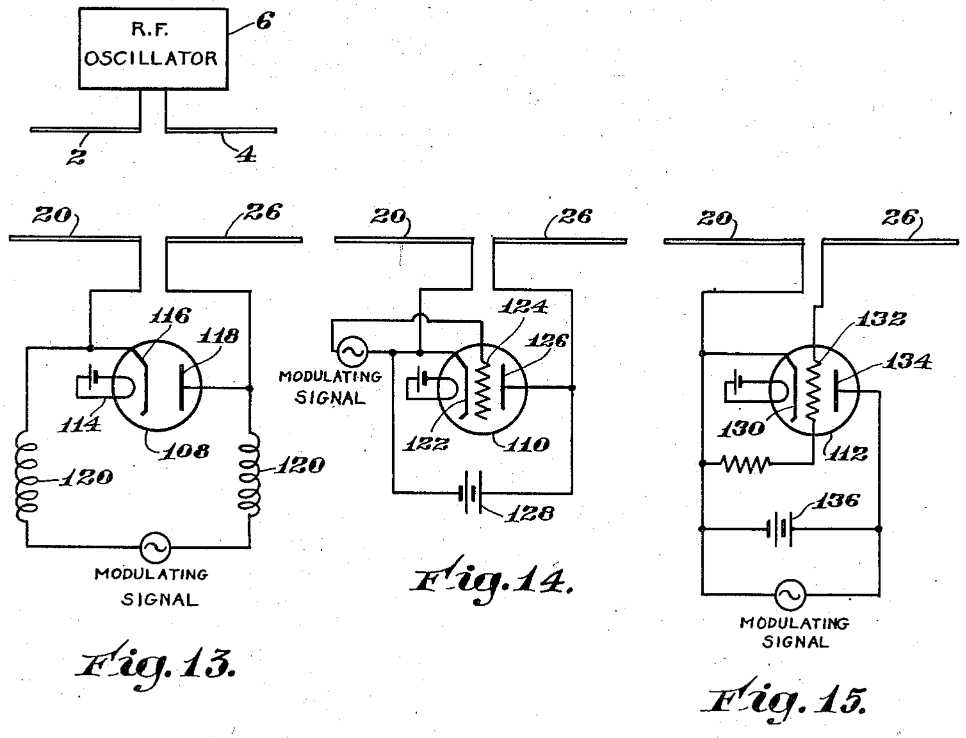

The invention will now be more fully explained in connection with the accompanying drawings in which Fig. 1 is a diagrammatic view of circuits and apparatus constructed in accordance with the present invention and illustrating the transmission and reception of radio waves modulated according to the principles of the present invention; Fig. 2 presents experimental curves illustrating the operation of the system of Fig. 1; Fig. 3 is a diagram similar to Fig. 1 illustrating the modulation of a received radio-wave signal; Fig. 4 is a schematic diagram illustrating a system for modulating reflected or directed radio waves in accordance with the present invention; Fig. 5 is a similar diagram illustrating the modulation of radio waves with the aid of a plurality of piezoelectric crystal devices; Fig. 6 is a similar diagram illustrating the modulation of transmitted electromagnetic waves by means of a vibrating diaphragm; Fig. 7 illustrates a preferred embodiment of the present invention in which the modulation is produced by electrical gas-discharge means; Fig. 8 is a diagram similar to Fig. 7 illustrating the modulation of reflected or directed radio waves; Fig. 9 is a reproduction of experimentally-obtained curves illustrating the performance of the system of Figs. 7 and 8; Fig. 10 is an experimental curve illustrating the operation of the system of Fig. 7 for various added antenna lengths; Fig. 11 is a schematic view of a portable radio-telephone application of the system of Fig. 1; Fig. 12 is a similar view of a portable radio-telephone embodying the system of Fig. 7; Figs. 13, 14 and 15 illustrate the modulation of radio waves in accordance with the present invention with the aid of electron-discharge tubes; and Figs. 16 and 17 illustrate modified modulating-tube systems.

An antenna of the type that emits radio waves into space in response to electrical excitation by radio-frequency energy supplied to the antenna by a radio-frequency-energy-generating electric system to which the antenna may be electrically connected is shown in Fig. 1. For purposes of illustration, the antenna is shown as comprising two dipole segments 2 and 4, though any other antenna may similarly be employed. A radio-frequency oscillator 6 constitutes such an electric system or source of radio-frequency energy connected to the antenna, for example, by a transmission line 1 in order electrically to excite the antenna to emit or transmit radio waves into space. An antenna portion or section 8 adjacent the dipole element or section 4 is shown provided with an electrical switch member 10. In response to the vibration of a vibrator 12, such as, for example, a magnetostrictive oscillator rod, a piezoelectric vibrator, a magnetomotive vibrator, a sound-wave emitter, or any mechanically vibrating device, the switch member 10 may be periodically vibrated into contact with the dipole element 4.

In a copending application, Serial No. 492,167, filed June 23, 1943, by Robert Harvey Rines for System and Method of Communication, it was disclosed that if the dimensions of an antenna are varied while the antenna is emitting or radiating radio waves, the radio waves will be found to be modulated in response to the dimensional variations. The techniques for effecting such dimensional and hence effective antenna impedance variations disclosed in the said Rines application included the mechanical vibration of the antenna and the variation of the electromagnetic coupling between a conducting element and a portion or section of the antenna.

The vibrator 12 of Fig. 1, for example, may, in accordance with the teaching of the said Rines application, similarly produce modulation in response to the vibration of the antenna element 4 if the switch 10 is permanently closed and the vibrator 12 continually vibrates the antenna element 4, or if the switch remains open and the spacing and hence the coupling between the elements 8—10 and the antenna section 4 is varied. It has been discovered, however, that much greater modulation effects can be produced by causing the vibrator 12 periodically to add and remove macroscopic lengths of antenna 8 to the antenna element 4 in series therewith as by means of the make-and-break switch member 10.

While it has been known that spurious effects result when a screw driver or some other conducting element accidentally scrapes a transmitting or receiving antenna, these effects have heretofore been considered in the nature of "static," have been deemed undesirable and have not been utilized. In accordance with the present invention, on the other hand, a method of controlling and employing these "undesirable, static" effects to produce a new and useful result has been provided. It has been found that if the antenna section 8 is touched into electrical contact with the section 4 by means of, for example, the switch 10, thereby providing a substantially zero-impedance, infinitely coupled connection therebetween, that during the instantaneous touching, a transient effect occurs resulting in a drain in the plate current of the oscillator 6. Similarly, the instant the switch member 10 is disconnected from the element 4, thereby varying the impedance between the antenna elements or sections 4 and 8 to a high value and reducing the coupling therebetween, there is also produced a similar transient effect. But during the period that the member 10 permanently connects the element 8 to the element 4, there is no such corresponding effect. There is merely the conventional steady-state effect of detuning or tuning an antenna system.

If, accordingly, the switch member 10 is caused to make and break contact between the antenna elements 4 and 8 at an audio frequency, for example, these transient effects will be produced at an audio rate. This has been found to result in modulating the radio waves emitted by the antenna 2—4 so that a corresponding audio communication signal may be received in a receiver 14.

This method of modulation produces depths of modulation that are comparable with the depths obtainable by actually applying signal voltages in the vacuum tube circuits of the oscillator 6, though without the need for such electronic modulating circuits. The full power of the oscillator 6 may thus be employed to drive the antenna 2—4 and the modulation may take place at the antenna itself by the external system 8—10—12. This feature is particularly important at microwave frequencies where it is difficult to modulate the oscillators. An extremely simple modulating device is provided which may be conveniently used, as an illustration, in applications where weight is of prime importance, as in portable radio telephones and aircraft equipment.

Experimental curves are illustrated in Fig. 2 which were obtained with the aid of an oscillator 6 operating at a frequency of 100 megacycles and feeding an unmatched dipole-antenna system having an element 2 of length 31 inches and an element 4 of length 5 inches. The receiver 14 was a Hallicrafter S-27 amplitude-modulation and frequency-modulation receiver. The results of Fig. 2 were obtained, however, with the amplitude-modulation part of the receiver. Various lengths of additional antenna 8 were periodically added and removed from the element 4 in make-and-break fashion and the instantaneous amplitude modulation received in the receiver 14 was observed as fluctuations upon a cathode-ray tube. The abscissa of Fig. 2 plots the various lengths $\Delta L$ of the added antenna section 8. The ordinate plots the corresponding relative amplitude of modulation detected in the receiver 14 and displayed upon the cathode-ray tube.

Curve A plots the variation in amplitude of modulation produced as the additional antenna length 8 was instantaneously added and removed from the element 4, as a function of the length $\Delta L$ of the added element 8. When the length of the element 8 plus the length of the element 4 was approximately one quarter of the radio wavelength, so that the antenna system 2, 4—8 was matched to the oscillator 6 and constituted a resonant system, a maximum depth of modulation of about 60 percent was obtained in this particular experiment, thereby indicating that the device 10—12 is preferably located at a region displaced from the region at which the transmission line is connected to the antenna for compromising impedance matching and modulation effect. Amplitudes of modulation in the neighborhood of 100 percent were obtained in other tests during the instantaneous changes in the dimensions of the antenna element 4. The addition of extremely long pieces of antenna had diminishing effects while the addition of very short pieces of antenna also had small effects. A broad range of different lengths of the antenna piece 8, shown at $L_1$, was found, however, within which a substantially constant depth of modulation was produced. A range $L_2$ was also found over which added length produced greater modulation, and a range $L_3$ was found over which the greater the antenna length, the smaller the depth of modulation.

Curve B is a plot of the change in radiated field strength of 400-cycle modulated radio waves transmitted by the antenna system when the corresponding lengths of the element 8 were held in continual steady-state contact with the element 4 so as to tune or detune the system. This curve appears to show little relation to the much larger modulation produced by the transient effects during instantaneous addition and removal of antenna lengths 8.

Depending upon the type of radio-frequency generating system used, phase or frequency modulation may also be produced. Frequency modulation spreads ranging from 0.5 megacycle down to a few kilocycles have been observed, though pure amplitude modulation is produced with frequency-controlled or buffer-stage isolated oscillators 6.

In some instances it may be desired to insert a modulation on a received radio-wave signal. If, for example, an ultrasonic or superaudible modulation is contained in a radio signal, it may be desired to beat another ultrasonic signal with the received signal, thereby to produce a beat frequency that may, for example, be in the audio range. According to present-day practice, the ultrasonically modulated signal would be received and fed to a mixer stage into which an ultrasonic signal from an ultrasonic generator would also be fed. The beat frequency would be produced in the mixer and then filtered out.

According to the present invention, on the other hand, an antenna 16, Fig. 3, for supporting received radio waves and feeding the radio-frequency energy thereof to a receiver electric system to evidence the reception of the waves, may be provided with an additional antenna length or section 18. The antenna length or section 18 may be instantaneously added and removed from the antenna 16 by the vibrator 12 operating the switch 10, as discussed in connection with the embodiment of Fig. 1. The received signal will be found to contain not only the original modulation of the received radio waves, but also the modulation produced by the vibrator 12, so that an audio beat may be detected in the receiver 14.

It is not necessary, however, that the antenna be connected either to a transmitting oscillator or other generating circuit or to a tuned receiver in order to make effective the instantaneous changes in antenna length in the form of a modulation. If a parasitic reflector antenna for supporting received radio waves and retransmitting the same, for example, such as the reflector antenna 20 of Fig. 4, is placed in the radiating field of a driven antenna 22 that is excited from an oscillator 24, it has been found that the instantaneous addition and removal of parasitic antenna length 26 by means of the vibrator 12 and the switch 10, as an illustration, will produce a modulation of the waves received and transmitted or re-radiated by the antenna 20—26.

The same phenomenon will be produced if the overall length of the reflector antenna 20—26 is less than an odd multiple of a quarter-wave length so that the element 20—26 acts as a director antenna instead of a reflector. The invention is not confined to linear reflecting and directing antenna elements alone, however, inasmuch as instantaneous changes in dimensions of other reflecting elements will produce similar effects. While it has previously been proposed to render reflecting or directing parasitic elements either completely effective or completely ineffective for purposes of providing different field patterns as in, for example, beacon and aircraft landing systems, in accordance with the present invention, such elements are utilized for actual communication with the aid of the techniques herein disclosed. In accordance with the present invention, the switch 10—12, indeed, may be positioned near an end of the antenna as shown in Fig. 4, so that the antenna is always effective.

Fig. 5 illustrates a convenient method of producing these instantaneous dimensional changes in the antenna. The radio-frequency oscillator 6 is shown exciting the dipole antenna 2—4 to emit radio waves of a given frequency into space. A variable impedance piezoelectric crystal 28, as, for example, quartz, Rochelle salt, dihydrogen potassium phosphate or any other piezoelectric crystal, provided with electrodes 30 and 32, may be vibrated by the electrical energy fed to the electrodes 30 and 32 from a signal source such as, for example, an audio oscillator 34.

In accordance with the invention disclosed in the said copending application, if the electrode 30 were placed continuously in contact with the element 2, either directly or through an insulating member, or if the electrode vibrated toward and from the element 2, a modulation of the radio waves would be produced. But if, on the other hand, as in accordance with the present invention, the electrode 30 is placed in close proximity to the element 2 so that in vibrating it makes and breaks electrical contact with the element 2, relatively large-amplitude instantaneous changes in the length of the element 2 are produced by the periodic addition and removal of the crystal electrode and its feed-line to and from the element 2. Large modulation effects result, as previously described. As in the case of the said copending application, when a quarter-wave dipole is employed, very large depths of modulation are produced with the vibrating element 28 near the end of the dipole. This same position has been found to be very effective for either hollow or solid elements 2, 4 supported mechanically at their inner ends.

It was found possible to vary the frequency of the audio oscillator 34 from a few cycles a second up to the ultra audio range in excess of 20,000 cycles with resulting communication modulation of the radio waves transmitted by the antenna 2. It has been found, furthermore, that a large number of the amplitude components as well as the frequency components of complex wave-forms, such as produced by voice or music, are reproduced by the make-and-break phenomenon. Voice and music have both been successfully transmitted.

The embodiment of Fig. 5 has particular application where multiple-channel transmission is desired, and a plurality of crystal elements may be used. If, for example, it is desired to modulate the radio waves transmitted from the antenna elements 2 and 4 with both an audio communition channel and with an ultrasonic communication channel, as an illustration, an ultrasonic signal generator 36 may be used to vibrate a further crystal 38, corresponding to the crystal 28, thereby to cause a make-and-break connection at ultrasonic frequencies between the crystal electrode 40 of the crystal 38 and the dipole element 4. The radio waves emitted by the element 4 will be modulated with the ultrasonic signal. The waves received at a receiving station, therefore, from the elements 2 and 4 will contain both the audio-frequency modulation of the oscillator 34 and the ultrasonic-frequency modulation of the oscillator 36.

Fig. 6 represents another embodiment which was found to produce extremely strong results. In this modification, a vibratory diaphragm such as, for example, the voice-coil element 42 of a loudspeaker, is shown placed in close proximity to a pointed spring 46. The spring 46 may be connected to the dipole element 2, as illustrated. As the diaphragm 42 is caused to vibrate back and forth in response, for example, to frequencies injected by a microphone 48, the spring 46 makes and breaks contact between the diaphragm 42 and the antenna element 2, thereby producing instantaneous changes in the length of element 2 which produce modulation.

The invention may be applied to other uses also, particularly to light-weight, radio telephony of the "walky-talky" type. In response to voice vibrations, for example, the switch 10, shown in Fig. 1, may be caused to make and break connection between the additional antenna element 8 and the element 4, thereby to produce modulation. The "walky-talky" would then only contain the transmitting oscillator 6 and no modulating stages. The modulator, furthermore, may be entirely mechanical, such as a sound-powered member, needing no electrical power to operate it.

A portable radio-telephone of this character is illustrated in Fig. 11 in which a portable support 64 is shown carrying a radio-frequency oscillator 72 and a mouth-piece or sound-collecting member 68 having a vibratory diaphragm 70. An antenna 66, excited by the oscillator 72 and carried by the support 64, is preferably provided with a contactor section 74 for periodically making and breaking electrical contact with the diaphragm section 70 as the diaphragm is mechanically vibrated in response to speech or other elastic vibrations.

It is not necessary, however, that the make-and-break connection be effected by mechanical vibratory means. It is preferable, indeed, for many applications to employ electrical means.

In the preferred embodiment of Fig. 7, for example, a two-electrode variable impedance gas-discharge tube is shown connected with one electrode 48 in contact with the antenna element or section 4 and with the other electrode 50 in contact with the section 8, at a region preferably, though not in all cases essentially, remote from the region at which the antenna is connected to the generator 6 for purposes of compromising impedance matching, before discussed, with modulation effect. Upon ionization of the gas in the tube 44, the impedance of the tube becomes relatively low, establishing electrical connection or very high coupling between the antenna elements 4 and 8; and upon deionization of the gas in the tube 44, the impedance of the tube becomes high so that the elements 4 and 8 are substantially electrically disconnected or loosely coupled. Modulation is produced, as before described, during the connecting and disconnecting processes controlled by this ionic switching means.

We have, as an illustration, employed a one-quarter watt General Electric "pea"-type neon tube 44 in series with an antenna element 4 connected to the electrode 48 and in series with an element 8 connected to the electrode 50. The oscillator 6 was operated at about 140 megacycles. Upon connecting across the electrodes 48 and 50 a voltage source 52 of potential at least enough to strike or ionize the neon gas in the tube 44, and upon removing the source of voltage 52, modulation having both frequency-modulation and amplitude modulation components for some types of oscillators has been produced.

If the direct-current voltage source 52 serves only as a biasing source either to ionize some of the gas in the tube or almost to produce ionization, and a signal is fed to the tube, such as an alternating-current communication signal of music or speech in a transformer inductance winding 54 connected across the electrodes 48 and 50, thereby to vary the ionization and hence the impedance of the tube or the coupling between the antenna sections 4 and 8, we have found that the music or speech signal will modulate the radio waves emitted by the antenna 2—4 with negligible noise and distortion. The biasing may be effected by the radio-frequency energy itself.

The effect upon the depth of modulation produced during the application in the transformer 54 of a sixty-cycle alternating switching voltage that, through operation upon a two-watt neon tube 44, periodically connected to and disconnected from the antenna element 4, antenna segments 8 having different lengths $\Delta L$, is shown in Fig. 10.

As an illustration of the degree of frequency modulation possible with an appropriate system of the type shown in Fig. 7, having a half-wave dipole operating with radio waves of about 140 megacycles frequency and employing a 2-watt neon tube 44 between the two antenna segments 4 and 8, a total frequency modulation of about 38 kilocycles was obtained for a 400-cycle, 25-volt alternating current signal. A 25-volt, 1000-cycle modulating signal produced a 16 kilocycle spread, and a 40-volt signal of the same frequency produced a 38 kilocycle spread.

The amount of modulation may be varied not only by varying the amount of added antenna length, but also by varying the degree of ionization of the gas tube, and by other means. A typical experimentally-obtained variation of amplitude of modulation with variation of modulation signal-strength, or of the degree of ionization of the neon tube, is plotted in curve C of Fig. 9.

We have found that the slope and general shape of the modulation curves may be controlled by the length of the antenna elements, by the gas concentration and pressure in the tube, by the bias voltage, and by other adjustments. Approximately linear, square-law, parabolic, cubic, exponential and other shapes have been produced. As an illustration, a sixty-cycle operated two-watt neon tube connected symmetrically between two parasitic elements, excited by 140-megacycle waves, produced a substantially exponential modulation curve for an over-all element length of about eighty-three inches; a substantially square-law curve for an element length of about thirty inches; and a long, substantially linear curve-portion for an element length of about forty inches.

The tube 44 may, if desired, have further electrodes for controlling the discharge such as, for example, a band electrode 43 outside the tube, as illustrated in Fig. 16. The biasing voltage 52 may be applied between the two internal electrodes 48 and 50, as an illustration, and a signal voltage may be applied through an inductance winding between the band electrode 43 and one of the inner electrodes 48. Other well-known multiple electrode arrangements may, of course, also be used.

As still a further illustration, instead of electrostatic means, a magnetic-field deflection coil 53 for controlling the discharge may be employed, as shown in Fig. 17, to deflect current flow between the electrodes 48 and 50 in response to a signal, thereby to connect and disconnect the antenna segments 4 and 8 with variable impedance.

A multiplicity of tubes may be employed on either or both of the antenna segments for enhanced results or multiple-channel work, in a manner similar to that previously discussed in connection with the system of Fig. 5.

A parasitic antenna element, such as the reflector 20—26 of Fig. 8 for receiving and supporting radio-wave energy and retransmitting the same, may similarly be provided with one or more variable-impedance ionic switching members, shown as the gas-discharge tube 44 symmetrically connected between the elements or sections 20 and 26. Equal elements 20 and 26 are not, of course, necessary in accordance with the present invention, as before stated in connection with the system of Fig. 4. This is because the present invention is primarily directed to modulation of radio waves with communication signals and the like, and not to merely rendering a parasitic device either operative or inoperative as in the prior-art beacon and similar systems before mentioned. When a switch 56 is thrown or opened, thereby applying or removing the battery 52 in the circuit connected between the electrodes 48 and 50 of the tube 44, the parasitic antenna elements 20 and 26 are instantaneously connected and disconnected, thereby producing the transient modulation effect before discussed. If the switch 56 is operated at an audio rate, for example, corresponding audio modulation will result.

The coil winding 54, shown in Fig. 7, may also be employed, of course, with the battery 52 of Fig. 8 for communication purposes. Similarly, the biasing battery 52 may be removed and only alternating current may periodically ionize the gas. When a biasing voltage is employed, however, as before described, extremely good quality and noiseless modulation is produced.

Curve D of Fig. 9 plots an experimentally-determined variation of amplitude of modulation during the sixty-cycle ionization and deionization of the tube 44 in the reflector system 20—26.

A portable radio-telephone employing gas-tube switching is illustrated in Fig. 12. A portable support 64 is shown carrying a radio-frequency oscillator 72 and a microphone 67, preferably of the carbon-button type. An antenna segment or section 65 is connected to one electrode of a gas tube 69 and a segment or section 63 is connected to a second electrode. The microphone 67 may be connected in series with a biasing battery 51, a limiting resistor R and the two electrodes of the gas tube 69 so that the voltage in this series circuit and hence the degree of ionization or impedance of the tube 69 is continuously varied in response to speech directed into the microphone 67. With the switch S closed, the radio-frequency oscillator 72 may directly energize the antenna 63—68 to emit radio waves modulated by the speech, as explained in connection with Fig. 7. With the switch S open, if radio waves are received and re-transmitted or reflected from the antenna 65, the reflected waves will be modulated by the speech, as described in connection with the embodiment of Fig. 8.

Electrical switching of two antenna segments or section has also been produced by connecting the antenna segments respectively to any two electrodes of an electron-discharge vacuum tube between which current may flow. In the circuit of Fig. 13, a conventional vacuum-tube diode is illustrated as provided with a heater 114, an electron-emissive cathode 116 connected to one antenna section 20, and a plate 118 connected to a second antenna section 26. While the antenna 20—26 is shown as a parasitic antenna that receives the waves from an antenna 24 driven by an oscillator 6, it is to be understood that the antenna 20—26 may also be a driven antenna. If a modulating signal is applied between the plate 118 and the cathode 116, the antenna segments are periodically connected by varying degrees of electron flow in the tube 108 as the tube impedance varies in response to the signal. Radio-frequency chokes 120 may, if desired, be connected in the modulating circuit as in the case of the other embodiments of the invention. Substantially noiseless and distortionless modulation of the radio waves radiated by the antenna 20—26 has been produced in this manner.

A conventional triode 110 is illustrated in Fig. 14, provided with a cathode 122 connected to one antenna segment 20, a control grid electrode 124, a plate 126 connected to the other antenna segment 26, and a plate-supply voltage source 128. The modulating signal is shown as applied between the control grid 124 and the cathode 122 as in conventional amplifier stages. The tube 110, indeed, may be the output stage of an amplifier system which is simultaneously serving as an electronic antenna switch. The modulation of the radio waves that is effected in accordance with the degree of electron flow in the tube 110 has been found to be somewhat less than that produced by gas-tube under the same operating conditions and with the same voltages. Though plate and other electrode voltages have been employed, they are not always essential to the operation of the device, since sufficient electron flow may occur in response to the voltages applied to the electrode by the modulating signal.

To avoid having electrode voltages on the antenna segments 20, 26, the segments may be connected between internal electrodes of the vacuum tube. In the embodiment of Fig. 15, as an example, the cathode 130 of the tube 112 may be connected to the antenna segment 20, and the segment 26 may be connected to the grid 132. The modulating signal is shown as supplied in parallel with the plate supply 136 connected between the cathode 130 and the plate 134.

While only diodes and triodes have been illustrated, it is to be understood that tetrodes, pentodes, and other conventional multi-electrode tubes may be employed. Similarly, several tubes may be used to produce multi-channel modulations as before discussed in connection with mechanical and ionic modulating devices.

Further modifications will occur to persons skilled in the art and all such are considered to fall within the spirit and scope of the invention as defined in the appended claims.

What is claimed is:

1. In a radio transmitter having a source of radio-frequency energy from which a predetermined amount of radio-frequency energy may be extracted by a first conducting element for the production of a carrier wave, an apparatus for signal-modulating the carrier wave that comprises means for producing a modulating signal and means for instantaneously connecting a second conducting element to the first conducting element in response to the modulating signal in order instantaneously to vary the predetermined amount of radio-frequency energy extracted from the source for the production of the carrier wave at the instant of the signal-responsive connection of the second conducting element to the first conducting element.

2. In a radio transmitter having a source of radio-frequency energy from which a predetermined amount of radio-frequency energy may be extracted by connected first and second conducting elements for the production of a carrier wave to be transmitted, an apparatus for signal-modulating the carrier wave that comprises means for producing a modulating signal and means for instantaneously disconnecting the second conducting element from the first conducting element in response to the modulating signal in order instantaneously to vary the predetermined amount of radio-frequency energy extracted from the source for the production of the carrier wave at the instant of the signal-responsive disconnection of the second conducting element from the first conducting element.

3. A radio transmitter having, in combination, an antenna of the type that emits radio waves into space in response to electrical excitation by radio-frequency energy drawn from a radio-frequency-energy generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, and means for adding or removing a section of antenna to or from the antenna to vary a dimension of the antenna during the emission of the radio waves by the antenna, thereby to effect modulation of the radio waves emitted by the antenna.

4. A radio transmitter having, in combination, an antenna of the type that emits radio waves into space in response to electrical excitation by radio-frequency energy drawn from a radio-frequency-energy-generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, means for producing a signal, and means for adding and removing a section of antenna to and from the antenna in accordance with the signal to vary a dimension of the antenna in accordance with the signal during the emission of the radio waves by the antenna, thereby to effect the signal-modulation of the radio waves emitted by the antenna.

5. A radio transmitter having, in combination, an antenna of the type that emits radio waves into space in response to electrical excitation by radio-frequency energy drawn from a radio-frequency-energy generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, and means comprising a mechanically vibratory switch for adding and removing a section of antenna to and from the antenna to vary a dimension of the antenna during the emission of the radio waves by the antenna, thereby to effect modulation of the radio waves emitted by the antenna.

6. A radio transmitter having, in combination, an antenna of the type that emits radio waves into space in response to electrical excitation by radio-frequency energy drawn from a radio-frequency-energy generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, and means comprising a gaseous-discharge switch for adding and removing a section of antenna to and from the antenna to vary a dimension of the antenna during the emission of the radio waves by the antenna, thereby to effect modulation of the radio waves.

7. A radio transmitter having, in combination, an antenna of the type that emits radio waves into space in response to electrical excitation by radio-frequency energy drawn from a radio-frequency-energy generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, and means comprising an electron-discharge switch for adding and removing a section of antenna to and from the antenna to vary a dimension of the antenna during the emission of the radio waves by the antenna, thereby to effect modulation of the radio waves.

8. A radio transmitter having, in combination, an antenna of the type that emits radio waves into space in response to electrical excitation by radio-frequency energy drawn from a radio-frequency-energy generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, and means for adding or removing a section of antenna to or from the antenna at a region displaced from the region at which the antenna is connected to the electric system to vary a dimension of the antenna during the emission of the radio waves by the antenna, thereby to effect modulation of the radio waves emitted by the antenna.

9. A radio transmitter having, in combination, an antenna of the type that emits radio waves into space in response to electrical excitation by radio-frequency energy drawn from a radio-frequency-energy generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, and means for adding or removing a section of antenna to or from the antenna at a region near an end of the antenna to vary a dimension of the antenna during the emission of the radio waves by the antenna, thereby to effect modulation of the radio waves emitted by the antenna.

10. A radio transmitter having, in combination, an antenna of the type that emits radio waves into space in response to electrical excitation by radio-frequency energy drawn from a radio-frequency-energy generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, and means comprising a mechanically vibratory switch for adding and removing a section of antenna to and from the antenna at a region displaced from the region at which the antenna is connected to the electric system to vary a dimension of the antenna during the emission of the radio waves by the antenna, thereby to effect modulation of the radio waves emitted by the antenna.

11. A radio transmitter having, in combination, an antenna of the type that emits radio waves into space in response to electrical excitation by radio-frequency energy drawn from a radio-frequency-energy generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, and means comprising a variable impedance element for varying the impedance between sections of the antenna to vary the effective impedance of the antenna during the emission of the radio waves by the antenna, thereby to effect modulation of the radio waves.

12. A radio transmitter having, in combination, an antenna of the type that emits radio waves into space in response to electrical excitation by radio-frequency energy drawn from a radio-frequency-energy-generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, means for producing a signal, and means comprising variable-impedance means the impedance of which may be varied in response to the signal for varying the impedance between sections of the antenna to vary the effective impedance of the antenna in accordance with the signal during the emission of the radio waves by the antenna, thereby to effect the signal-modulation of the radio waves.

13. A radio transmitter having, in combination, an antenna of the type that emits radio waves into space in response to electrical excitation by radio-frequency energy drawn from a radio-frequency-energy-generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, means for producing an audio signal, and means comprising variable-impedance means the impedance of which may be varied in response to the audio signal for varying the impedance between sections of the antenna to vary the effective impedance of the antenna in accordance with the audio signal during the emission of the radio waves by the antenna, thereby to effect the audio signal-modulation of the radio waves.

14. A radio transmitter having, in combination, an antenna of the type that emits radio waves into space in response to electrical excitation by radio-frequency energy drawn from a radio-frequency-energy-generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, means for producing an ultrasonic signal, and means comprising variable-impedance means the impedance of which may be varied in response to the ultrasonic signal for varying the impedance between sections of the antenna to vary the effective impedance of the antenna in accordance with the ultrasonic signal during the emission of the radio waves by the antenna, thereby to effect the ultrasonic signal-modulation of the radio waves.

15. A radio transmitter having, in combination, an antenna of the type that emits radio waves into space in response to electrical excitation by radio-frequency energy drawn from a radio-frequency-energy generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, means for producing an electric-voltage signal, and means comprising variable-impedance means the impedance of which may be varied in response to the voltage of the signal for varying the impedance between sections of the antenna correspondingly to vary the effective impedance of the antenna in accordance with the signal during the emission of the radio waves by the antenna, thereby to effect the signal-modulation of the radio waves.

16. A radio transmitter having, in combination, an antenna of the type that emits radio waves into space in response to electrical excitation by radio-frequency energy drawn from a radio-frequency-energy generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, means for producing an electric-voltage signal, and means comprising variable-impedance means the impedance of which may be varied in response to the voltage of the signal for varying the impedance between sections of the antenna at a region displaced from the region at which the antenna is connected to the electric system, correspondingly to vary the effective impedance of the antenna in accordance with the signal during the emission of the radio waves by the antenna, thereby to effect the signal-modulation of the radio waves.

17. A radio transmitter having, in combination, an antenna of the type that emits radio waves into space in response to electrical excitation by radio-frequency energy drawn from a radio-frequency-energy generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, means for producing an electric-voltage signal, and means comprising variable-impedance means the impedance of which may be varied in response to the voltage of the signal for varying the impedance between sections of the antenna at a region near the region at which the antenna is connected to the electric system correspondingly to vary the effective impedance of the antenna in accordance with the signal during the emission of the radio waves by the antenna, thereby to effect the signal-modulation of the radio waves.

18. A radio transmitter having, in combination, an antenna of the type that emits radio waves into space in response to electrical excitation by radio-frequency energy drawn from a radio-frequency-energy-generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, means for producing an electric-voltage signal, means comprising gaseous-discharge means controlled in accordance with the voltage of the signal for varying the impedance between sections of the antenna to vary the effective impedance of the antenna in accordance with the signal during the emission of the radio waves by the antenna, thereby to effect the signal-modulation of the radio waves.

19. A radio transmitter having, in combination, an antenna of the type that emits radio waves into space in response to electrical excitation by radio-frequency energy drawn from a radio-frequency-energy-generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, means for producing an electric-voltage signal, means comprising gaseous-discharge means controlled in accordance with the voltage of the signal for varying the impedance between sections of the antenna at a region displaced from the region at which the antenna is connected to the electric system to vary the effective impedance of the antenna in accordance with the signal during the emission of the radio waves by the antenna, thereby to effect the signal-modulation of the radio waves.

20. A radio transmitter having, in combination, an antenna of the type that emits radio waves into space in response to electrical excitation by radio-frequency energy drawn from a radio-frequency-energy generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, means comprising gaseous-discharge means for varying the impedance between sections of the antenna, means for partially ionizing the gaseous-discharge means, means for producing an electrical signal, and means for applying the electrical signal to the gaseous-discharge means to vary the ionization thereof in accordance with the signal, thereby correspondingly to vary the impedance between the said antenna sections during the emission of the radio waves by the antenna, in order to effect the signal-modulation of the radio waves.

21. A radio transmitter having, in combination, an antenna of the type that emits radio waves into space in response to electrical excitation by radio-frequency energy drawn from a radio-frequency-energy-generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, means for producing a signal, and means comprising gaseous-discharge means responsive to the signal for varying the degree of electromagnetic coupling between adjacent sections of the antenna in accordance with the signal during the emission of the radio waves by the antenna, in order to effect the signal-modulation of the radio waves emitted by the antenna.

22. A radio transmitter having, in combination, an antenna of the type that emits radio waves into space in response to electrical excitation by radio-frequency energy drawn from a radio-frequency-energy-generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, means for producing a signal, and means comprising mechanical-switch means responsive to the signal for varying the degree of electromagnetic coupling between adjacent sections of the antenna in accordance with the signal during the emission of the radio waves by the antenna, in order to effect the signal-modulation of the radio waves emitted by the antenna.

23. A radio transmitter having, in combination, an antenna of the type that emits radio waves into space in response to electrical excitation by radio-frequency energy drawn from a radio-frequency-energy-generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, means for producing a signal, and means comprising electron-discharge means responsive to the signal for varying the degree of electromagnetic coupling between adjacent sections of the antenna in accordance with the signal during the emission of the radio waves by the antenna, in order to effect the signal-modulation of the radio waves emitted by the antenna.

24. A radio transmitter having, in combination, an antenna of the type that emits radio waves into space in response to electrical excitation by radio-frequency energy drawn from a radio-frequency-energy generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, means for producing a signal, means comprising variable impedance means the impedance of which may be varied in response to the signal, means for connecting the variable impedance means at a region between the electric system and an end of the antenna, and means for controlling the variable impedance means in accordance with the signal of the signal-producing means during the emission of the radio waves by the antenna correspondingly to effect the signal-modulation of the radio waves.

25. A radio transmitter having, in combination, an antenna of the type that emits radio waves into space in response to electrical excitation by radio-frequency energy drawn from a radio-frequency-energy-generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, variable impedance means the impedance of which may be varied in response to a signal, and means for connecting the variable impedance means in series with a pair of sections of the antenna to vary the impedance between the antenna sections in accordance with the signal, thereby correspondingly to vary the effective impedance of the antenna during the emission of the radio waves by the antenna in order to signal-modulate the radio waves emitted by the antenna.

26. A radio transmitter of the character described in claim 24 and in which the variable impedance means comprises a gaseous-discharge tube.

27. A radio transmitter of the character described in claim 24 and in which means is provided whereby a satisfactory impedance match may be effected between the electric system and the antenna.

28. A radio transmitter having, in combination, an antenna of the type that emits radio waves into space in response to electrical excitation by radio-frequency energy drawn from a radio-frequency-energy-generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, gaseous-discharge variable impedance means the impedance of which may be varied in response to a signal, and means for connecting the gaseous-discharge variable impedance means in series with a pair of sections of the antenna to vary the impedance between the antenna sections in accordance with the signal, thereby correspondingly to vary the effective impedance of the antenna during the emission of the radio waves by the antenna in order to signal-modulate the radio waves emitted by the antenna.

29. A radio transmitter having, in combination, an antenna of the type that emits radio waves into space in response to electrical excitation by radio-frequency energy drawn from a radio-frequency-energy generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, a plurality of variable impedance means the impedance of each of which may be varied in response to signals, and means for connecting each of the plurality of variable impedance means in series with sections of the antenna to vary the impedance between the antenna sections in accordance with the signals, thereby correspondingly to vary the effective impedance of the antenna during the emission of the radio waves by the antenna in order to signal-modulate the radio waves emitted by the antenna.

30. A radio transmitter having, in combination, an antenna of the type that emits radio waves into space in response to electrical excitation by radio-frequency energy drawn from a radio-frequency-energy generating electric system prior to the emission of the radio-frequency energy as radio waves, an electric system for generating radio-frequency energy, means electrically connecting the antenna to the electric system in order that the antenna may draw radio-frequency energy from the electric system, thereby to cause the antenna to emit radio waves into space, a plurality of variable impedance means the impedance of each of which may be varied in response to signals, a plurality of signal-producing means, one for controlling the impedance of each of the plurality of variable impedance means in accordance with the signals, and means for connecting each of the plurality of variable impedance means to vary the impedance between sections of the antenna in accordance with the signals, thereby correspondingly to vary the effective impedance of the antenna during the emission of the radio waves by the antenna in order to signal-modulate the radio waves emitted by the antenna.

31. A radio transmitter of the character described in claim 30 and in which each of the plurality of signal-producing means produces a signal of different frequency.

32. A radio transmitter of the character described in claim 24 and in which the variable impedance means comprises piezoelectric means.

33. A radio transmitter or receiver having, in combination, an antenna of the type that emits radio waves into space in response to electrical excitation by radio-frequency energy drawn from a radio-frequency-energy-generating electric system prior to the emission of the radio-frequency energy as radio waves or that receives radio waves from space that may be evidenced in a radio-frequency-energy receiving electric system, an electric system for generating or receiving radio-frequency energy, means electrically connecting the antenna to the electric system in order that the antenna may draw radio-frequency energy from the electric system thereby to cause the antenna to transmit radio waves into space, or may receive radio waves from space and feed the radio-frequency energy thereof to the electric system thereby to evidence the receipt of the radio waves, and means for adding or removing a section of antenna to or from the antenna to vary a dimension of the antenna during the transmission or reception of the radio waves by the antenna, thereby to effect modulation of the radio waves transmitted or received by the antenna.

34. A radio transmitter or receiver having, in combination, an antenna of the type that emits radio waves into space in response to electrical excitation by radio-frequency energy drawn from a radio-frequency-energy-generating electric system prior to the emission of the radio-frequency energy as radio waves or that receives radio waves from space that may be evidenced in a radio-frequency-energy receiving electric system, an electric system for generating or receiving radio-frequency energy, means electrically connecting the antenna to the electric system in order that the antenna may draw radio-frequency energy from the electric system thereby to cause the antenna to transmit radio waves into space, or may receive radio waves from space and feed the radio-frequency energy thereof to the electric system thereby to evidence the receipt of the radio waves, and means comprising a variable impedance element for varying the impedance between sections of the antenna to vary the effective impedance of the antenna during the transmission or reception of the radio waves by the antenna, thereby to effect modulation of the transmitted or received radio waves.

35. A radio transmitter or receiver having, in combination, an antenna of the type that emits radio waves into space in response to electrical excitation by radio-frequency energy drawn from a radio-frequency-energy-generating electric system prior to the emission of the radio-frequency energy as radio waves or that receives radio waves from space that may be evidenced in a radio-frequency-energy receiving electric system, an electric system for generating or receiving radio-frequency energy, means electrically connecting the antenna to the electric system in order that the antenna may draw radio-frequency energy from the electric system thereby to cause the antenna to transmit radio waves into space, or may receive radio waves from space and feed the radio-frequency energy thereof to the electric system thereby to evidence the receipt of the radio waves, and means comprising a gaseous-discharge variable impedance element for varying the impedance between sections of the antenna to vary the effective impedance of the antenna during the transmission or reception of the radio waves by the antenna, thereby to effect modulation of the transmitted or received radio waves.

36. In a radio receiving system, an antenna of the type that receives radio waves from space that may be evidenced in a radio-frequency-energy receiving electric system, an electric system for receiving radio-frequency energy, means electrically connecting the antenna to the electric system in order that the antenna may receive radio waves from space and feed the radio-frequency energy thereof to the electric system, thereby to evidence the receipt of the radio waves, and gaseous-discharge variable impedance means for varying the impedance between sections of the antenna to vary the effective impedance of the antenna during the reception of the radio waves by the antenna, thereby to effect modulation of the received radio waves.

37. A radio system having, in combination, an antenna having first and second sections for transmitting or receiving radio waves, a gaseous-discharge device having a pair of electrodes, means for connecting one electrode to the first section of the antenna and the other electrode to the second section of the antenna, means for partially ionizing the gas of the gaseous discharge device to produce a discharge between the electrodes, and means responsive to a modulation signal for modifying the ionization of the gas in accordance with the modulation signal, thereby to signal-modulate the radio waves transmitted or received by the antenna.

38. A radio system having, in combination, an antenna having first and second sections for transmitting or receiving radio waves, a gaseous-discharge device having a pair of electrodes, means for connecting one electrode to the first section of the antenna and the other electrode to the second section of the antenna, direct-current means for partially ionizing the gas of the gaseous discharge device to produce a discharge between the electrodes, and means responsive to a modulation signal for modifying the ionization of the gas in accordance with the modulation signal, thereby to signal-modulate the radio waves transmitted or received by the antenna.

39. A radio system having, in combination, an antenna having first and second sections for transmitting or receiving radio waves, a gaseous-discharge device having a pair of electrodes, means for connecting one electrode to the first section of the antenna and the other electrode to the second section of the antenna, means for partially ionizing the gas of the gaseous-discharge device to produce a discharge between the electrodes, and means comprising a microphone responsive to a modulation signal for modifying the ionization of the gas in accordance with the modulation signal, thereby to signal-modulate the radio waves transmitted or received by the antenna.

40. A radio system having, in combination, an antenna having first and second sections for transmitting or receiving radio waves, a gaseous-discharge device having a pair of electrodes, means for connecting one electrode to the first section of the antenna and the other electrode to the second section of the antenna, means comprising a direct-current voltage source for partially ionizing the gas of the gaseous-discharge device to produce a discharge between the electrodes, and means comprising a microphone in series with the voltage source responsive to a modulation signal for modifying the ionization of the gas in accordance with the modulation signal, thereby to signal-modulate the radio waves transmitted or received by the antenna.

41. A radio system having, in combination, an antenna having first and second sections for receiving radio waves, a gaseous-discharge device having a pair of electrodes, means for connecting one electrode to the first section of the antenna and the other electrode to the second section of the antenna, means for partially ionizing the gas of the gaseous discharge device to produce a discharge between the electrodes, and means responsive to a modulation signal for modifying the ionization of the gas in accordance with the modulation signal, thereby to signal-modulate the radio waves received by the antenna.

42. A radio system having, in combination, an antenna having first and second sections for receiving radio waves, a gaseous-discharge device having a pair of electrodes, means for connecting one electrode to the first section of the antenna and the other electrode to the second section of the antenna, means for partially ionizing the gas of the gaseous discharge device to produce a discharge between the electrodes, and means comprising a gas-discharge controlling element responsive to a modulation signal for modifying the ionization of the gas in accordance with the modulation signal, thereby to signal-modulate the radio waves received by the antenna.

43. A radio system having, in combination, an antenna having first and second sections for supporting radio-wave energy, variable impedance means the impedance of which varies in response to a voltage signal interconnecting the sections of the antenna, means for producing a biasing voltage for biasing the operation of the variable impedance means, means for producing a modulation voltage signal, and means for feeding the modulation voltage signal to the variable impedance means for varying the impedance of the variable impedance means and the effective impedance of the antenna in accordance with the modulation voltage signal, correspondingly to signal-modulate the radio-wave energy supported by the antenna.

44. A radio system having, in combination, an antenna having first and second sections for supporting radio-wave energy, variable impedance means the impedance of which varies in response to a voltage signal interconnecting the sections of the antenna, means for producing a communication modulation voltage signal of audio frequency, means for feeding the communication modulation voltage signal to the variable impedance means to vary the value of the impedance in accordance with the audio frequency variation of the communication modulation voltage signal, thereby correspondingly to vary the impedance between the antenna sections and the effective impedance of the antenna in order to modulate the radio-wave energy supported by the antenna with the communication modulation voltage signal of audio frequency.

45. A radio system having, in combination, an antenna for supporting radio-wave energy, vibratory means operative in response to its vibration periodically to add and remove a section of antenna to and from the antenna, means for applying vibrations of audio frequency to the vibratory means to cause the vibratory means to add and remove the said antenna section to and from the antenna at the said audio frequency, thereby to vary a dimension of the antenna at the said audio frequency in order correspondingly to modulate the radio-wave energy supported thereby with an audio-frequency modulation.

46. A radio system having, in combination, an antenna for supporting radio-wave energy, vibratory means operative in response to its vibration periodically to add and remove a section of antenna to and from the antenna, means for applying vibrations of ultrasonic frequency to the vibratory means to cause the vibratory means to add and remove the said antenna section to and from the antenna at the said ultrasonic frequency, thereby to vary a dimension of the antenna at the said ultrasonic frequency in order correspondingly to modulate the radio-wave energy supported thereby with an ultrasonic-frequency modulation.

47. A radio system having, in combination, an antenna for supporting radio-wave energy, vibratory means operative in response to its vibration periodically to add and remove a section of antenna to and from the antenna near an end of the antenna, means for applying vibrations of audio frequency to the vibratory means to cause the vibratory means to add and remove the said antenna section to and from the antenna at the said audio frequency, thereby to vary a dimension of the antenna at the said audio frequency in order correspondingly to modulate the radio-wave energy supported thereby with an audio-frequency modulation.

48. A radio system having, in combination, an antenna for supporting radio-wave energy, vibratory diaphragm means operative in response to its vibration periodically to add and remove a section of antenna to and from the antenna, means for applying vibrations of audio frequency to the vibratory means to cause the vibratory means to add and remove the said antenna section to and from the antenna at the said audio frequency, thereby to vary a dimension of the antenna at the said audio frequency in order correspondingly to modulate the radio-wave energy supported thereby with an audio-frequency modulation.

49. A radio system having, in combination, an antenna having first and second sections for supporting radio-wave energy, variable impedance means the impedance of which varies in response to a voltage signal interconnecting the sections of the antenna, an inductance shunting the variable impedance means, means for producing a communication modulation voltage signal of audio frequency, means for feeding the communication modulation voltage signal to the variable impedance means to vary the value of the impedance in accordance with the audio-frequency variation of the communication modulation voltage signal, thereby correspondingly to vary the impedance between the antenna sections and the effective impedance of the antenna in order to modulate the radio-wave energy supported by the antenna with the communication modulation voltage signal of audio frequency.

50. A radio system of the character described in claim 49 and in which the variable impedance means comprises a discharge tube and the inductance comprises a radio-frequency coil.

51. A radio transmitter of the character described in claim 43 and in which the variable impedance means comprises electron-discharge means.

ROBERT H. RINES.
ISAAC S. BLONDER.

REFERENCES CITED

The following references are of record in the file of this patent:

UNITED STATES PATENTS

| Number | Name | Date |
|---|---|---|
| 1,506,736 | Dorfman | Sept. 2, 1924 |
| 1,876,320 | Trogner | Sept. 6, 1932 |
| 2,085,226 | Moser | June 29, 1937 |
| 2,106,770 | Southworth | Feb. 1, 1938 |
| 2,112,301 | Moser | Mar. 29, 1938 |
| 2,159,937 | Zworykin | May 23, 1939 |
| 2,173,234 | Linder | Sept. 19, 1939 |
| 2,182,118 | Girond | Dec. 5, 1939 |
| 2,189,549 | Hershberger | Feb. 6, 1940 |
| 2,210,666 | Herzog | Aug. 6, 1940 |
| 2,218,223 | Uselman | Oct. 15, 1940 |
| 2,248,778 | Perroux | July 8, 1941 |
| 2,272,611 | Lair et al. | Feb. 10, 1942 |
| 2,407,250 | Busignies | Sept. 10, 1946 |
| 2,408,425 | Jenks | Oct. 1, 1946 |
| 2,425,328 | Jenks | Aug. 12, 1947 |

FOREIGN PATENTS

| Number | Country | Date |
|---|---|---|
| 494,822 | Great Britain | Nov. 1, 1938 |
| 678,290 | Germany | July 12, 1939 |